July 11, 1939.                J. MIHALYI                2,165,402

PHOTOGRAPHIC CAMERA

Filed Jan. 11, 1938

Joseph Mihalyi
INVENTOR

BY
ATTORNEYS

Patented July 11, 1939

2,165,402

UNITED STATES PATENT OFFICE 2,165,402

PHOTOGRAPHIC CAMERA

Joseph Mihalyi, Rochester, N. Y., assignor to Eastman Kodak Company, Rochester, N. Y., a corporation of New Jersey Application January 11, 1938, Serial No. 184,448

3 Claims. (Cl. 95—44)

This invention relates to photographic cameras of the reflex and twin lens finder type which provide finder images of substantially the size of the picture to be taken and more particularly to cameras of this type provided with range finders for aiding the user in focusing.

Heretofore in cameras of this type, the finder has usually been provided with means such as a ground glass for fixing the finder image and focusing was accomplished by observing the sharpness of the fixed image. The image fixing means necessarily reduced the apparent brightness of the image making it difficult to focus on poorly lighted subjects and at best required an experienced user to determine the point of sharpest focus.

It is an object of this invention to provide cameras of this type with range finders coupled to the focusing mechanism so that the camera may be focused with greater precision.

Another object of the invention is the provision of this type of camera with separate focusing means as to eliminate the necessity of an image fixing means thereby permitting a greater amount of light for view finding purposes.

Another object of the invention is the provision of a novel arrangement whereby the range and view finder images are simultaneously visible to the user.

Still another object of the invention is the provision of an arrangement whereby the range finder forms in the margin of or adjacent to the view finder image, images of objects substantially in the center of the field of view.

Other objects of the invention relate to the arrangement and organization of parts which provide a compact, sturdy and accurate device.

Still other objects and advantages of the invention will be apparent from the following description when read in connection with the accompanying drawing in which are shown only those parts of complete cameras which are necessary to a full understanding of the invention.

The invention will be explained as embodied in two specific forms as incorporated in a twin lens and a reflex type camera, respectively, but it is to be understood that either form may be employed upon either type and that other similar forms are contemplated by the invention.

Figure 1:
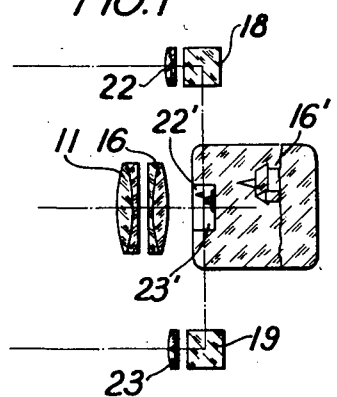
Fig. 1 is a plan view of the optics of one embodiment of the invention.
Figure 2:
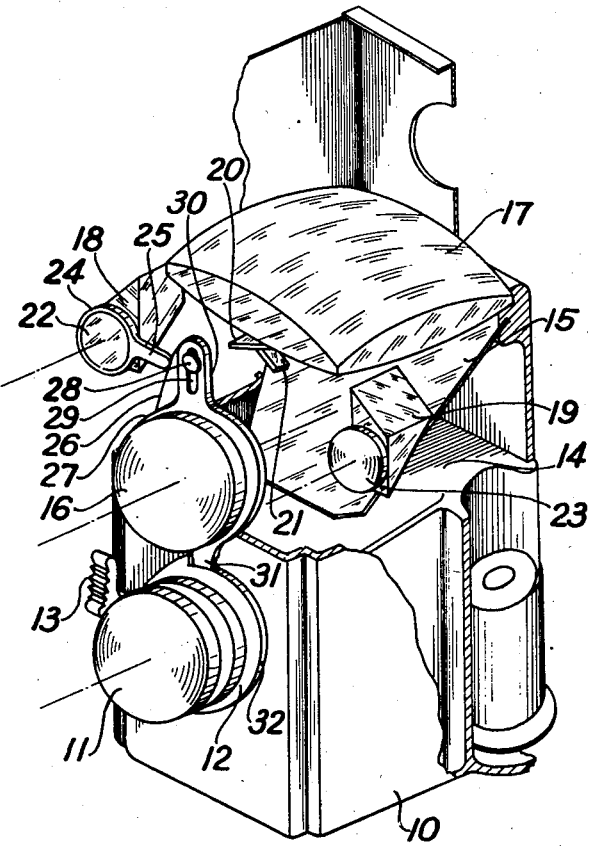
Fig. 2 is a view in perspective with portions torn away of a camera provided with the range and view finder shown in Fig. 1.

The specific embodiment shown in Figs. 1 and 2 of the drawing as illustrative of the invention comprises a twin lens type of camera 10 having an objective lens 11 suitably carried by a support 12 secured to the camera 10 and movable by means of a lever 13 in any well known manner for focusing. As is well known, the camera 10 is provided with a horizontal partition 14 dividing the exposure chamber from the finder chamber which is preferably located in the upper half of the camera 10 as illustrated.

The finder chamber above the partition 14 houses a reflector 15 positioned to receive image bearing light transmitted by a finder lens 16 and direct it upwardly through a field lens 17 located substantially in the plane of the image formed by the lens 16. In the preferred arrangement no image fixing means is employed, the aerial image formed by the lens 16 being rendered visible to an observer by the field lens 17 thereby providing a more brilliant image for finding purposes.

It being impossible to focus by means of a brilliant type finder as described, and it being difficult to secure the best focus even when an image fixing surface is provided in the finder, I prefer, in accordance with the invention to provide a range finder for this purpose. As shown in Figs. 1 and 2 the range finder may comprise two laterally spaced beam accepting members, here shown as Porro prisms 18 and 19 which direct the accepted beams along the base line to two reflecting members 20 and 21 so positioned as to direct the beams upwardly through the field lens 17. Located in the two range finder beams are lenses 22 and 23 which are adapted to form images in substantially the plane of the image formed by the finder lens 16. The images formed by the lenses 16, 22 and 23 appear to an observer as shown in Fig. 1 and are designated 16', 22' and 23', respectively.

For coupling the range finder to the focusing movement of the camera objective 11, one of the range finder lenses 22 is provided with a mount 24 having a laterally projecting arm 25 which bears against a cam 26 carried by a supporting ring 27 for the finder lens 16. This securing frame 27 for the finder lens 16 is secured to the camera 10 by means of a headed pin 28 extending through a vertical slot 29 provided in an ear 30 formed on the frame 27. This frame 27 also has a downwardly projecting lug 31 which rides on a cam surface 32 provided on the periphery of the mount 12 for the camera objective 11. These last described parts are so arranged that movement of the focusing lever 13 rotates the cam 33 to move in a vertical direction, the frame 27 and its lens 16 to compensate for parallax in the view finder image formed by the lens 16. This vertical movement of the frame 27 varies the position of the cam 26 with respect to the arm 25, thereby imparting lateral movement to the range finder lens 22 which shifts its image 22' in accordance with the distance for which the camera objective 11 is focused.

It will be appreciated by those skilled in the art that the several optical parts shown in the drawing as unsupported will be suitably mounted on the camera 10 so as to perform their intended functions.

Figure 3:
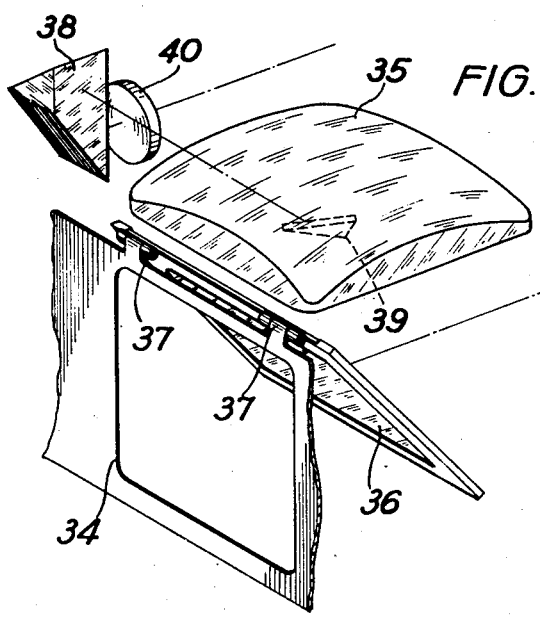
Fig. 3 is a view in perspective of the optical parts of a reflex camera incorporating another embodiment of the invention.

The above described range finder arrangement may be also employed on a reflex type of camera in which, by means of a swinging mirror, the objective lens of the camera is employed for view finding purposes. Certain parts of such a reflex camera are shown in Fig. 3 as comprising an objective 33, an exposure window 34, a finder field lens 35, and a mirror 36 hinged at 37 so that it may be swung from the view finding position shown out of the path of the image forming rays coming from the objective 33 for making a photographic exposure.

Figure 4:
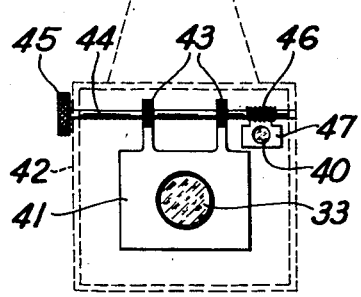
Fig. 4 is a front elevation partly in outline of the camera of Fig. 3 showing an arrangement for coupling the camera focusing movement to the range finder.

Although the range finder described in connection with Figs. 1 and 2 may be employed on the reflex cameras shown in Figs. 3 and 4, I have illustrated this camera as being provided with a different type range finder to indicate the scope of the invention. In this embodiment a beam of light spaced from the optic axis of the objective 33 is directed through a finder field lens 35 in any suitable manner as by a Porro prism 38 and a reflecting member 39 positioned under the field lens 35. In this light beam is positioned a lens 40 for forming in the field lens 35 an image of that portion of the field of view which is blotted out by the reflecting member 39 to provide the complete image in the view finder which may be mutilated when the camera is in other than the correct focus.

A somewhat similar arrangement is disclosed in my copending application, Serial No. 165,357, filed September 23, 1937, and is there shown as applied to a twin lens type of camera. In the present arrangement, as shown in Fig. 4, the camera objective 33 is carried in a lens board 41 which is adapted to be moved toward and away from the exposure window 34 provided in a camera casing 42 by means of two toothed wheels 43 carried on a shaft 44 which is adapted to be turned by a knob 45 for focusing the camera in a well known manner. This shaft 44 is also provided with a worm 46 which meshes with teeth carried by a frame 47 in which the range finder lens 40 is mounted.

Figure 5:
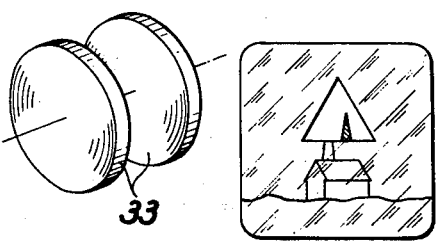
Fig. 5 shows the field of view as it appears to the user of the camera shown in Figs. 3 and 4.

With this arrangement the observer will see two images as shown in Fig. 5 and when these two images form a mutilated image as shown, he will know that the camera is not correctly focused. The focus is then altered by turning the knob 45 until the observed images combine to form a non-mutilated image at which time he will known the camera objective 33 is properly focused for making an exposure.

It will be evident to those skilled in the art that the present invention provides a simple, compact and accurate arrangement whereby a large brilliant finder may be employed on reflex and twin lens cameras and also an arrangement for insuring more exact focus even if it is desirable to employ an image receiving surface in connection with the finder as is now customary.

While I have described in detail two specific embodiments of my invention, it is to be understood that its scope, as pointed out in the appended claims, is intended to cover all those modifications which an understanding of the above disclosure will make obvious to those skilled in the art.

What I claim is:

1. In a photographic camera having an exposed chamber and an objective therefor, a finder chamber, a lens in the front of the finder chamber adapted to form an image of substantially the same size as the picture to be taken, a mirror between said lens and its image plane for rotating said image plane through ninety degrees, whereby the view finder image is normally horizontal, a range finder including a beam accepting and a beam combining system for forming in said image plane adjacent images of a portion of the field as seen from two spaced points, and a field lens positioned in said image plane, whereby the finder image and said range finder images may be viewed simultaneously.

2. In a camera, an objective adjustable for focusing the camera, a view finder including a lens and a mirror for providing a reversed image of substantially the size of the picture to be taken, means for rendering the reversed image visible to an observer, a base type range finder adapted to accept its measuring beams of light from objects located substantially on the optic axis of said objective, said range finder including means for imaging said measuring beams in and near the margin of said reversed image in the finder, whereby the range finder images and said reversed finder image may be viewed simultaneously, and means coupling the range finder to the adjustable objective.

3. In a camera, a view finder comprising an image forming lens, a field lens and light deflecting means for directing light transmitted by the image forming lens through the field lens, and a range finder comprising spaced means for accepting two light beams from the scene visible in the view finder and directing them through said field lens in the same direction as the light employed for view finding and in side by side relation, and means in the path of each of said light beams for forming in the field lens images of adjacent portions of the field of view visible in the view finder image, whereby the view finder image and the adjacent range finder images are simultaneously visible to an observer.

JOSEPH MIHALYI.